(12) United States Patent
Kaku

(10) Patent No.: US 12,464,100 B2
(45) Date of Patent: Nov. 4, 2025

(54) INFORMATION PROCESSING APPARATUS, PROJECTION METHOD, AND NON-TRANSITORY COMPUTER READABLE MEDIUM

(71) Applicant: TOYOTA JIDOSHA KABUSHIKI KAISHA, Aichi-ken (JP)

(72) Inventor: Wataru Kaku, Musashino (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 401 days.

(21) Appl. No.: 18/318,171

(22) Filed: May 16, 2023

(65) Prior Publication Data

US 2023/0379442 A1     Nov. 23, 2023

(30) Foreign Application Priority Data

May 17, 2022   (JP) .................................. 2022-081179

(51) Int. Cl.
*H04N 9/31* (2006.01)
*G09B 5/02* (2006.01)
*G09B 11/00* (2006.01)

(52) U.S. Cl.
CPC ............. *H04N 9/3182* (2013.01); *G09B 5/02* (2013.01); *G09B 11/00* (2013.01); *H04N 9/315* (2013.01)

(58) Field of Classification Search
CPC .... H04N 9/3179; H04N 9/3182; G09B 11/00; G09B 5/02; G06V 30/18105
See application file for complete search history.

(56) References Cited

U.S. PATENT DOCUMENTS

| | | |
|---|---|---|
| 2004/0233213 A1 | 11/2004 | Ohsawa |
| 2018/0322803 A1* | 11/2018 | Jaworski .................. G09B 5/06 |

FOREIGN PATENT DOCUMENTS

| | | |
|---|---|---|
| JP | 2001054131 A | 2/2001 |
| JP | 2005293290 A | 10/2005 |
| JP | 2006113424 A | 4/2006 |
| JP | 2010258759 A | 11/2010 |

* cited by examiner

*Primary Examiner* — Ryan D Howard
(74) *Attorney, Agent, or Firm* — HAUPTMAN HAM, LLP

(57) ABSTRACT

An information processing apparatus acquires a first image of a first medium including a first region in which a character is written. The information processing apparatus projects the first image onto a predetermined position of a second medium. The information processing apparatus acquires a second image of the second medium including a second region in which a line of a different color from the character depicted in the projected first image is drawn. The information processing apparatus corrects color data of an overlapping region in which the first region and the second region overlap in the second image. The information processing apparatus projects the corrected second image onto the first medium so that the position of the character matches.

20 Claims, 7 Drawing Sheets

INFORMATION PROCESSING APPARATUS, PROJECTION METHOD, AND NON-TRANSITORY COMPUTER READABLE MEDIUM

CROSS-REFERENCE TO RELATED APPLICATION

This application claims priority to Japanese Patent Application No. 2022-081179 filed on May 17, 2022, the entire contents of which are incorporated herein by reference.

TECHNICAL FIELD

The present disclosure relates to an information processing apparatus, a projection method, and a non-transitory computer readable medium.

BACKGROUND

Technology for image projection is known. For example, Patent Literature (PTL) 1 discloses technology for comparing a character on a sheet of paper with reference information and projecting parts to be corrected onto the sheet of paper.

CITATION LIST

Patent Literature

PTL 1: JP 2005-293290 A

SUMMARY

In e-learning of calligraphy using actual calligraphy tools (paper, brush, inkstone, and the like), the student's character and the instructor's line (correction line indicating improvements) are overlapped twice, once when an image of correction results is captured on the instructor's side, and once when the correction results are projected on the student's side. In the overlapping region, the brightness or saturation of the color of the instructor's line decreases, yielding a darker color tone, i.e., causing darkening. Darkening reduces the visibility of improvements and the reproducibility of correction results on the student side, making it difficult to enhance the learning effect with e-learning of calligraphy. However, conventional image projection does not take these issues into account. Therefore, there is room for improvement with respect to technology for image projection.

It would be helpful to improve technology for image projection.

An information processing apparatus according to an embodiment of the present disclosure is an information processing apparatus including a controller configured to:
  acquire a first image of a first medium including a first region in which a character is written,
  project the first image onto a predetermined position of a second medium,
  acquire a second image of the second medium including a second region in which a line of a different color from the character depicted in the projected first image is drawn,
  correct color data of an overlapping region in which the first region and the second region overlap in the second image, and
  project the corrected second image onto the first medium so that a position of the character matches.

A projection method according to an embodiment of the present disclosure is a projection method to be executed by an information processing apparatus, the projection method including:
  acquiring a first image of a first medium including a first region in which a character is written;
  projecting the first image onto a predetermined position of a second medium;
  acquiring a second image of the second medium including a second region in which a line of a different color from the character depicted in the projected first image is drawn;
  correcting color data of an overlapping region in which the first region and the second region overlap in the second image; and
  projecting the corrected second image onto the first medium so that a position of the character matches.

A non-transitory computer readable medium according to an embodiment of the present disclosure is a non-transitory computer readable medium storing a program configured to cause an information processing apparatus to execute operations, the operations including:
  acquiring a first image of a first medium including a first region in which a character is written;
  projecting the first image onto a predetermined position of a second medium;
  acquiring a second image of the second medium including a second region in which a line of a different color from the character depicted in the projected first image is drawn;
  correcting color data of an overlapping region in which the first region and the second region overlap in the second image; and
  projecting the corrected second image onto the first medium so that a position of the character matches.

According to an embodiment of the present disclosure, technology related to image projection is improved.

DETAILED DESCRIPTION

Figure 1:
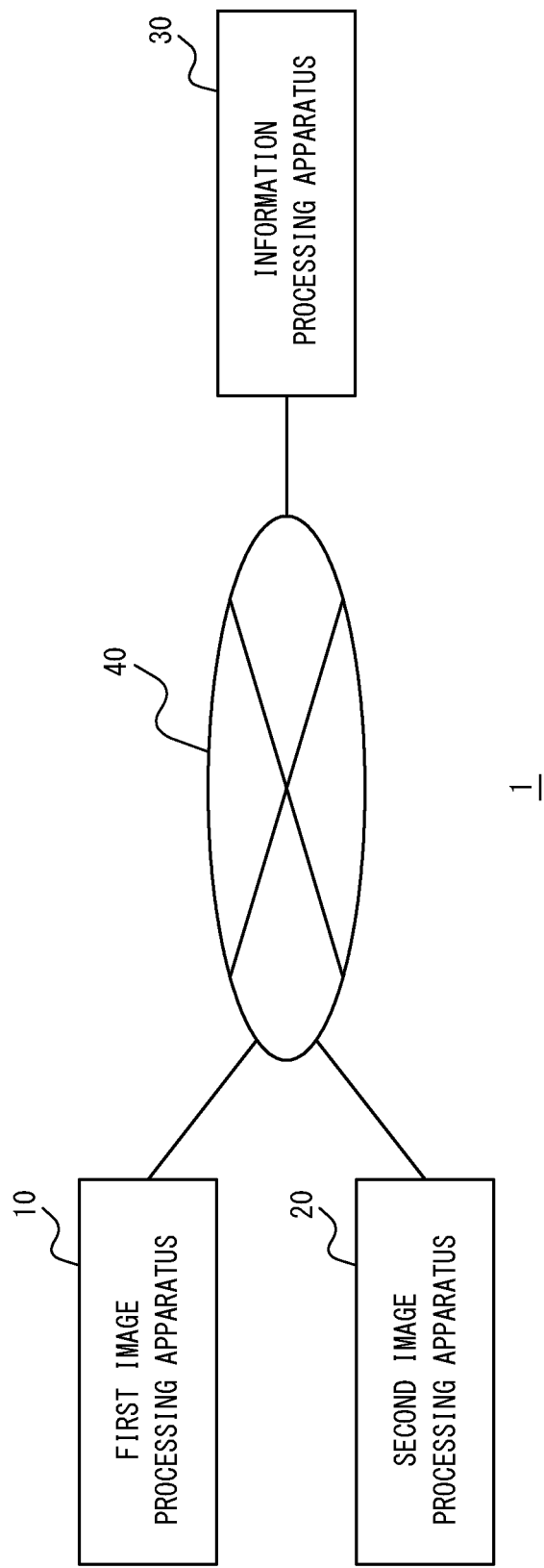
FIG. 1 is a block diagram illustrating a schematic configuration of a system according to an embodiment of the present disclosure.

Hereinafter, an embodiment of the present disclosure will be described.
<Outline of Embodiment>
An outline of a system 1 according to an embodiment of the present disclosure will be described with reference to FIG. 1. The system 1 includes a first image processing apparatus 10, a second image processing apparatus 20, and an information processing apparatus 30. The first image processing apparatus 10, the second image processing apparatus 20, and the information processing apparatus 30 are communicably connected to a network 40 including, for example, the Internet, a mobile communication network, and the like.

The first image processing apparatus 10 is an apparatus that includes an imager and a projection device (for example, a projector) in the present embodiment, but this example is not limiting, and the first image processing apparatus 10 may be any image processing apparatus. The projector may be of any type, such as a liquid crystal display (LCD) projector, a liquid crystal on silicon (LCOS) projector, or a digital light processing (DLP) projector. The projector generally projects images by projecting the three primary colors of red (R), green (G), and blue (B) light, modulated based on image signals, onto a projection surface (paper, wall, screen, or the like). The laser beams of each color may be scanned two-dimensionally by optical scanning means to project the image. The first image processing apparatus 10 is installed above the head of the calligraphy student (hereinafter also referred to as the "first user") in the present embodiment, but the first image processing apparatus 10 can be installed at any position. The number of first image processing apparatuses 10 included in the system 1 can be freely determined.

The second image processing apparatus 20 is an apparatus that includes an imager and a projection device (for example, a projector) in the present embodiment, but this example is not limiting, and the second image processing apparatus 20 may be any image processing apparatus. The projector may be of any type, such as an LCD projector, DLP projector, or LCOS projector. The projector generally projects images by projecting the three primary colors of red (R), green (G), and blue (B) light, modulated based on image signals, onto a projection surface. The laser beams of each color may be scanned two-dimensionally by optical scanning means to project the image. The second image processing apparatus 20 is installed above the head of the calligraphy instructor (hereinafter also referred to as the "second user") in the present embodiment, but the second image processing apparatus can be installed at any position. The number of second image processing apparatuses 20 included in the system 1 can be freely determined.

The information processing apparatus 30 is, for example, a computer such as a server apparatus. The information processing apparatus 30 can communicate with the first image processing apparatus 10 and the second image processing apparatus 20 via the network 40.

First, an outline of the present embodiment will be described, and details thereof will be described later. The information processing apparatus acquires a first image of a first medium including a first region in which a character is written. The information processing apparatus 30 projects the first image onto a predetermined position of a second medium. The information processing apparatus 30 acquires a second image of the second medium including a second region in which a line of a different color from the character depicted in the projected first image is drawn. The information processing apparatus 30 corrects color data of an overlapping region in which the first region and the second region overlap in the second image. The information processing apparatus 30 projects the corrected second image onto the first medium so that the position of the character matches.

In this way, according to the present embodiment, the second image, in which the color data of the overlapping region is corrected, is projected onto the first medium so that the position of the character matches. Thus, for example, even in a case in which darkening occurs in an overlapping region in the second image, the second image can be projected onto the first medium with the color data corrected so that a predetermined percentage of the darkening is eliminated. Accordingly, the technology related to image projection is improved in that the visibility of improvements and the reproducibility of correction results on the first user's side are improved, and the learning effect with e-learning of calligraphy is enhanced.

Next, configurations of the system 1 will be described in detail.

<First Image Processing Apparatus Configuration>

Figure 2:
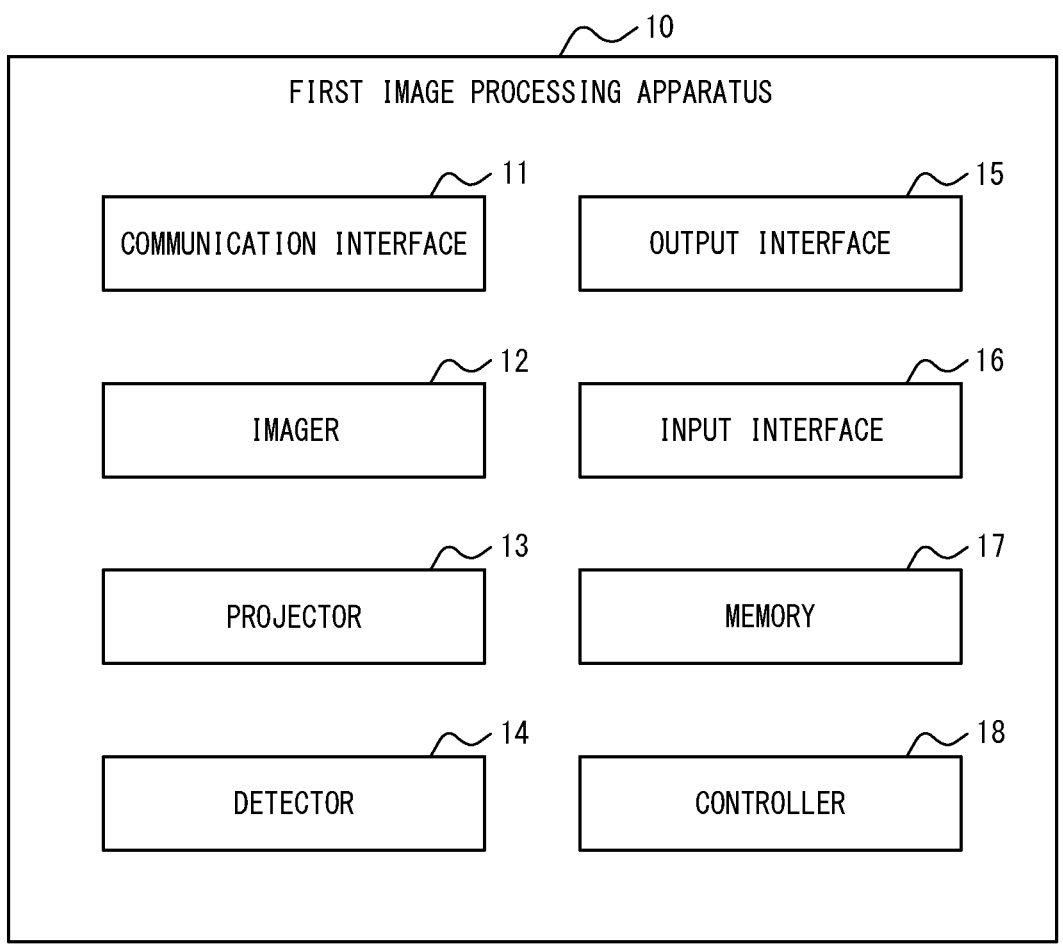
FIG. 2 is a block diagram illustrating a schematic configuration of a first image processing apparatus.

As illustrated in FIG. 2, the first image processing apparatus 10 includes a communication interface 11, an imager 12, a projector 13, a detector 14, an output interface 15, an input interface 16, a memory 17, and a controller 18.

The communication interface 11 includes at least one communication interface for connecting to the network 40. The communication interface is compliant with mobile communication standards such as the 4th generation (4G) standard or the 5th generation (5G) standard, for example, but these examples are not limiting. In the present embodiment, the first image processing apparatus 10 can communicate with the second image processing apparatus 20 and the information processing apparatus 30 via the communication interface 11 and the network 40.

The imager 12 includes one or more cameras. Each camera included in the imager 12 is a so-called digital camera that has an imaging element such as a charge coupled device (CCD) or a complementary metal oxide semiconductor (CMOS) image sensor. The imager 12 captures an image of a subject at a predetermined frame rate and outputs image data of the resulting captured image. The image data obtained via the imager 12 can constitute a moving image as a frame image. In an embodiment, the imager 12 acquires an image of the first medium.

The projector 13 includes an image display element, a light source, and a projection lens. For example, as the image display element, a liquid crystal is used in a case in which the first image processing apparatus 10 is an LCD or LCOS projector, and a Digital Micromirror Device (DMD) is used in a case in which the first image processing apparatus 10 is a DLP projector. The light source irradiates projection light onto the image display element and projects an image onto a projection surface through the projector 13. The light source can also irradiate illumination light in addition to the projection light. The irradiation range of the projection light and the irradiation range of the illumination light may be the same or different. The projection lens displays the image of the image display element on the projection surface while magnifying or reducing the image at any magnification. In an embodiment, the projector 13 projects an image onto the first medium.

The detector 14 includes any sensor module capable of acquiring information indicating the state of the projection plane onto which images are projected from the projector 13. For example, the state of the projection plane includes the distance between the projection plane and the projector 13, the displacement of the projection plane, or a combination of these. For example, the sensor module includes a laser sensor, a photoelectric sensor, an ultrasonic sensor, or a combination of these.

The output interface 15 includes at least one interface for output. The interface for output is, for example, a display or a speaker. The display is, for example, an LCD or an organic electro luminescent (EL) display. The output interface 15 outputs data obtained by the operations of the first image processing apparatus 10. The output interface 15 may be connected to the first image processing apparatus 10 as an external output device, instead of being included in the first image processing apparatus 10. As an interface for connection, for example, an interface compliant with a standard such as Universal Serial Bus (USB) or Bluetooth® (Bluetooth is a registered trademark in Japan, other countries, or both) can be used.

The input interface 16 includes at least one interface for input. The interface for input is, for example, a physical key, a capacitive key, a pointing device, a touch screen integrally provided with the display, or a microphone. The input interface 16 accepts an operation for inputting data to be used for the operations of the first image processing apparatus 10. The input interface 16 may be connected to the first image processing apparatus 10 as an external input device, instead of being included in the first image processing apparatus 10. As an interface for connection, an interface compliant with a standard such as USB or Bluetooth®, for example, can be used.

The memory 17 includes one or more memories. The memories are semiconductor memories, magnetic memories, optical memories, or the like, for example, but are not limited to these. The memories included in the memory 17 may each function as, for example, a main memory, an auxiliary memory, or a cache memory. The memory 17 stores any information to be used for operations of the first image processing apparatus 10. For example, the memory 17 may store a system program, an application program, embedded software, or the like. The information stored in the memory 17 may be updated with, for example, information acquired from the network 40 via the communication interface 11. In the present embodiment, the memory 17 can store images or moving images captured via the imager 12 and information acquired via the detector 14.

The controller 18 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 18 controls operations of the entire first image processing apparatus 10.

<Second Image Processing Apparatus Configuration>

Figure 3:
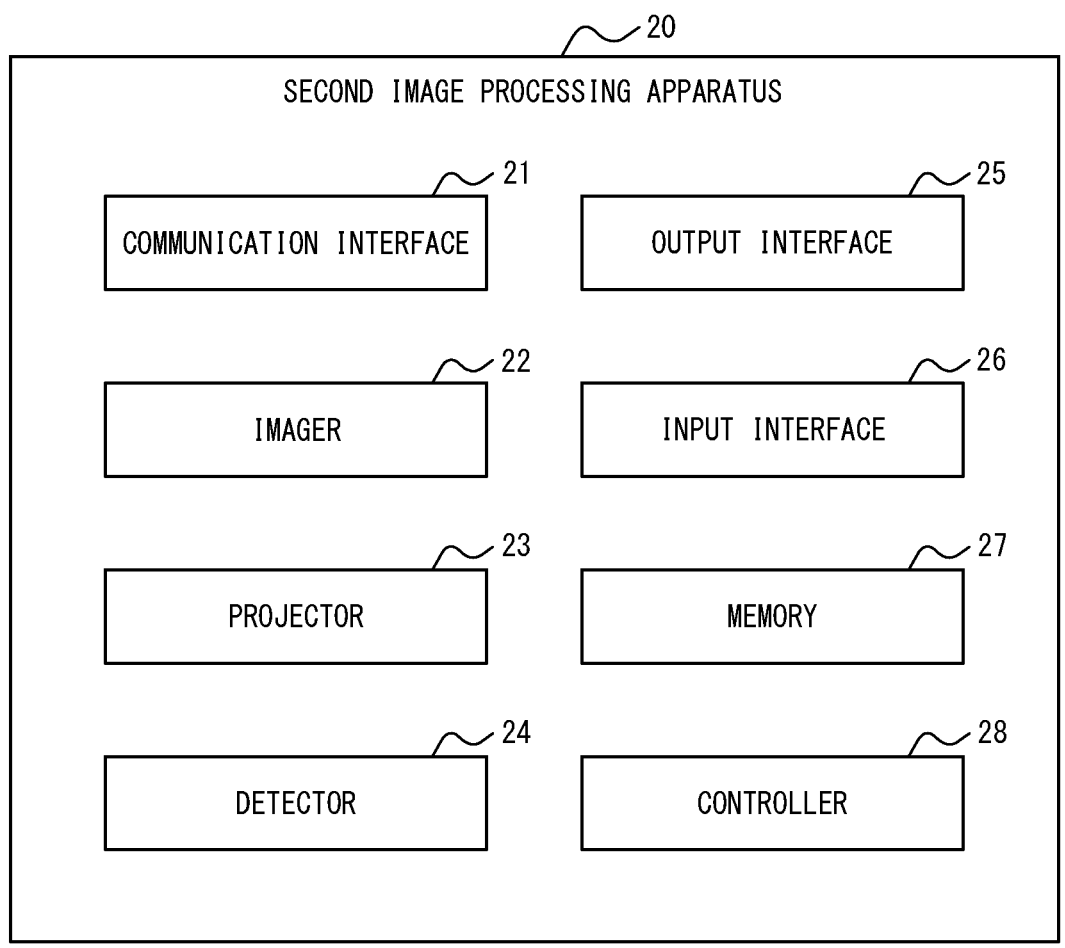
FIG. 3 is a block diagram illustrating a schematic configuration of a second image processing apparatus.

As illustrated in FIG. 3, the second image processing apparatus 20 includes a communication interface 21, an imager 22, a projector 23, a detector 24, an output interface 25, an input interface 26, a memory 27, and a controller 28.

The communication interface 21 includes at least one communication interface for connecting to the network 40. The communication interface is compliant with a mobile communication standard such as 4G or 5G, for example, but is not limited to these. In the present embodiment, the second image processing apparatus 20 can communicate with the first image processing apparatus 10 and the information processing apparatus 30 via the communication interface 21 and the network 40.

The imager 22 includes one or more cameras. Each camera included in the imager 22 is a so-called digital camera that has an imaging element such as a CCD or a CMOS image sensor. The imager 22 captures an image of a subject at a predetermined frame rate and outputs image data of the resulting captured image. The image data obtained via the imager 22 can also constitute a moving image as a frame image. In an embodiment, the imager 22 acquires an image of the second medium.

The projector 23 includes an image display element, a light source, and a projection lens. For example, as the image display element, a liquid crystal is used in a case in which the second image processing apparatus 20 is an LCD or LCOS projector, and a DMD is used in a case in which the first image processing apparatus 10 is a DLP projector. The light source irradiates projection light onto the image display element and projects an image onto a projection surface through the projector 23. The light source can also irradiate illumination light in addition to the projection light. The irradiation range of the projection light and the irradiation range of the illumination light may be the same or different. The projection lens displays the image of the image display element on the projection surface while magnifying or reducing the image at any magnification. In an embodiment, the projector 23 projects an image onto the second medium.

The detector 24 includes any sensor module capable of acquiring information indicating the state of the projection plane onto which images are projected from the projector 23. For example, the state of the projection plane includes the distance between the projection plane and the projector 23, the displacement of the projection plane, or a combination of these. For example, the sensor module includes a laser sensor, a photoelectric sensor, an ultrasonic sensor, or a combination of these.

The output interface 25 includes at least one interface for output. The interface for output is, for example, a display or a speaker. The display is, for example, an LCD or an organic EL display. The output interface 25 outputs data obtained by the operations of the second image processing apparatus 20. The output interface 25 may be connected to the second image processing apparatus 20 as an external output device, instead of being included in the second image processing apparatus 20. As an interface for connection, an interface compliant with a standard such as USB or Bluetooth®, for example, can be used.

The input interface 26 includes at least one interface for input. The interface for input is, for example, a physical key, a capacitive key, a pointing device, a touch screen integrally provided with the display, or a microphone. The input interface 26 accepts an operation for inputting data to be used for the operations of the second image processing apparatus 20. The input interface 26 may be connected to the second image processing apparatus 20 as an external input device, instead of being included in the second image processing apparatus 20. As an interface for connection, an interface compliant with a standard such as USB or Bluetooth®, for example, can be used.

The memory 27 includes one or more memories. The memories are semiconductor memories, magnetic memories, optical memories, or the like, for example, but are not limited to these. The memories included in the memory 27 may each function as, for example, a main memory, an auxiliary memory, or a cache memory. The memory 27 stores any information to be used for operations of the second image processing apparatus 20. For example, the memory 27 may store a system program, an application program, embedded software, or the like. The information stored in the memory 27 may be updated with, for example, information acquired from the network 40 via the communication interface 21. In the present embodiment, the memory 27 can store images or moving images captured via the imager 22 and information acquired via the detector 24.

The controller 28 includes at least one processor, at least one programmable circuit, at least one dedicated circuit, or a combination of these. The processor is a general purpose processor such as a CPU or a GPU, or a dedicated processor that is dedicated to specific processing, for example, but is not limited to these. The programmable circuit is an FPGA, for example, but is not limited to this. The dedicated circuit is an ASIC, for example, but is not limited to this. The controller 28 controls operations of the entire second image processing apparatus 20.

<Information Processing Apparatus Configuration>

Figure 4:
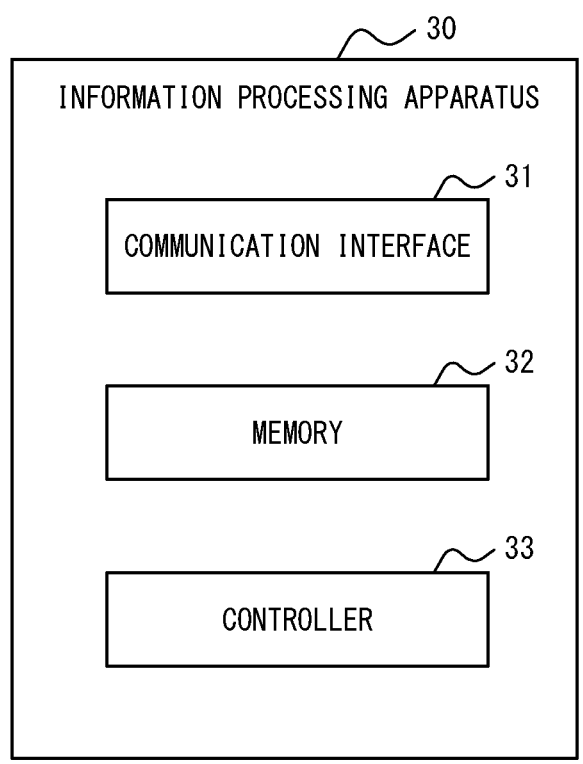
FIG. 4 is a block diagram illustrating a schematic configuration of an information processing apparatus.

As illustrated in FIG. 4, the information processing apparatus 30 includes a communication interface 31, a memory 32, and a controller 33.

The communication interface 31 includes at least one communication interface for connecting to the network 40. The communication interface may be compliant with, for example, mobile communication standards, wired local area network (LAN) standards, or wireless LAN standards, but these examples are not limiting. The communication interface may be compliant with any appropriate communication standards. In the present embodiment, the information processing apparatus 30 can communicate with the first image processing apparatus 10 and the second image processing apparatus 20 via the communication interface 31 and the network 40.

The memory 32 includes one or more memories. The memories included in the memory 32 may each function as, for example, a main memory, an auxiliary memory, or a cache memory. The memory 32 stores any information used for operations of the information processing apparatus 30. For example, the memory 32 may store a system program, an application program, a database, map information, and the like. The information stored in the memory 32 may be updated with, for example, information acquired from the network 40 via the communication interface 31.

The controller 33 includes at least one processor, at least one programmable circuit, at least one dedicated circuit, or a combination of these. The controller 33 controls the operations of the entire information processing apparatus 30.

<Flow of Operations of Information Processing Apparatus>

Figure 5:
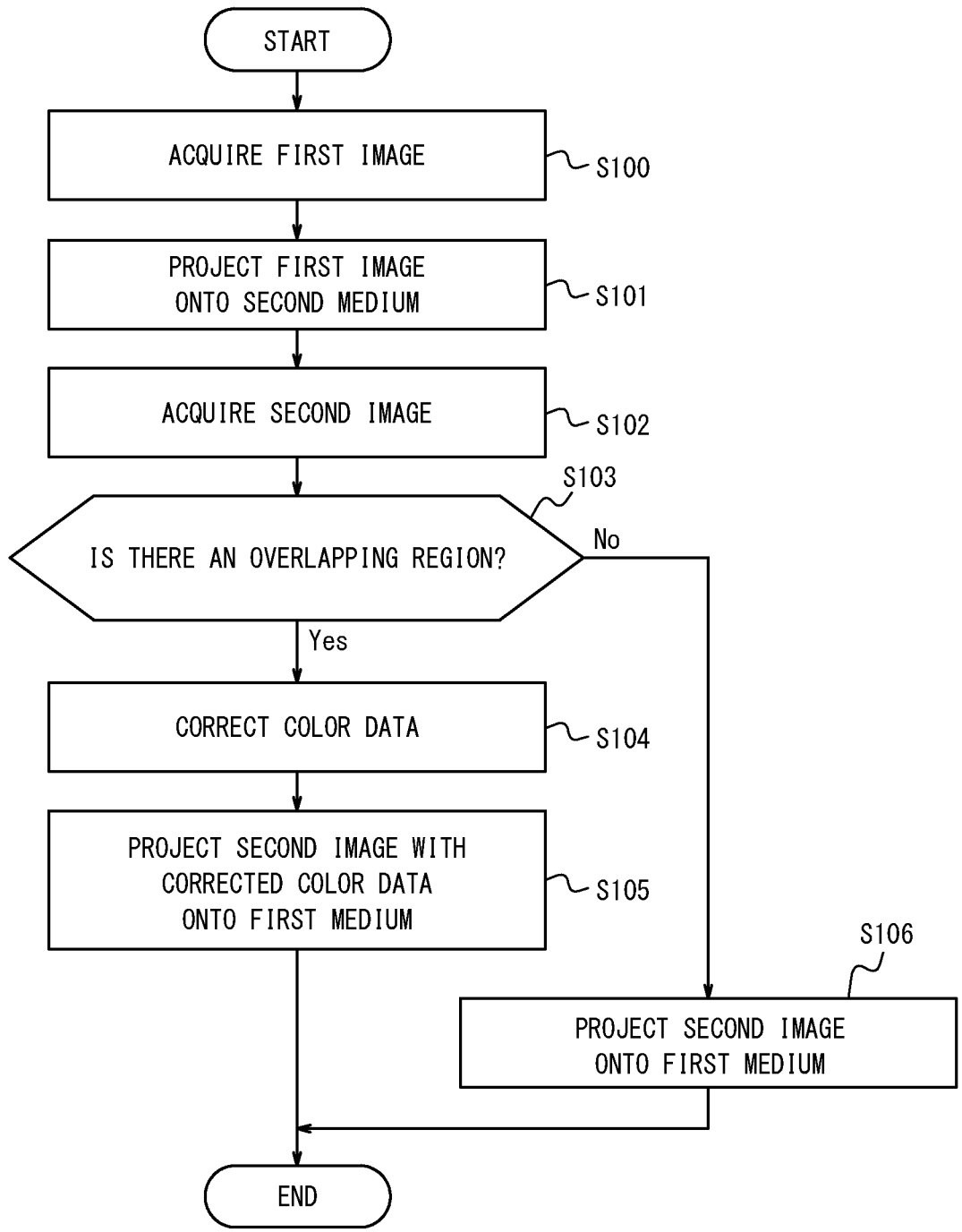
FIG. 5 is a flowchart illustrating operations of the information processing apparatus.

Operations of the information processing apparatus 30 according to the present embodiment will be described with reference to FIG. 5. The operations in FIG. 5 correspond to a projection method according to the present embodiment. The operations in FIG. 5 are performed repeatedly over a predetermined period. In the present embodiment, the operations in FIG. 5 are performed each time an intention to submit work is detected, as described below. However, the predetermined period is not limited to this example and can be set freely.

In the following explanation, an "assigned work" is a sheet of paper with a character written on it, obtained by the first user writing the character on a white sheet of paper (hereinafter also referred to as the "sheet of paper on first user's side") with a brush dipped in ink of a predetermined color. The predetermined color is black in the present embodiment, and thus the color of the character is black. The color of the character is not limited to black, however, and any color can be adopted. The "correction result" refers to a sheet of paper obtained by the second user adding a line indicating improvements, with a brush dipped in ink of a different color than the color of the character, in overlap with at least a portion of a first region, in which the character is written, within the region of an image, indicating the sheet of paper on the first user's side, projected on a white sheet of paper on the second user's side (hereinafter also referred to as the "sheet of paper on the second user's side"). The color that is different from the color of the character is vermilion in the present embodiment, and thus the color of the line is vermilion. The color of the line is not limited to vermilion, however, and any color other than the color of the character can be adopted.

In the following explanation, the first user and the second user are each assumed to write characters or lines with a brush dipped in ink of different colors on a rectangular sheet of paper (for example, pulp paper) of the same size (for example, 334 mm long by 243 mm wide) placed on a mounting table (for example, a desk) while in a seated position on a chair, instead of sitting upright on the floor. A rectangular felt mat of the same size (for example, 360 mm by 260 mm long) is placed between the mounting table and the sheet of paper to prevent staining of the mounting table. However, the material and size of the sheet of paper and mat are not limited to these examples and can be selected freely.

Step S100: the controller 33 of the information processing apparatus acquires a first image of a first medium including a first region in which a character is written.

Figure 6:
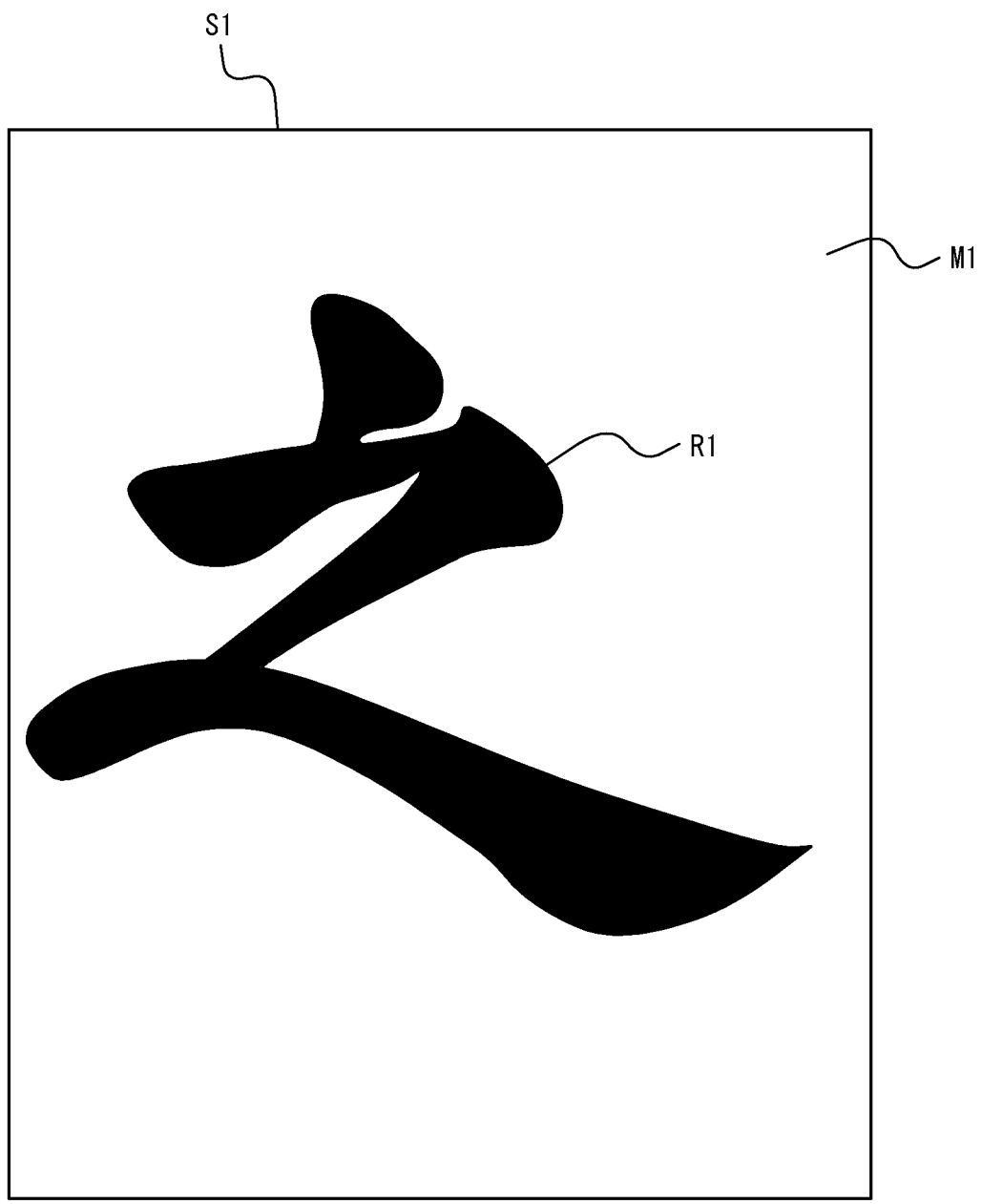
FIG. 6 is a diagram illustrating a specific example of a first image.

Specifically, the communication interface 31 of the information processing apparatus 30 receives, from the communication interface 11 of the first image processing apparatus 10 via the network 40, an image, captured by the imager 12, of the sheet of paper on the first user's side including the region in which the character was written by the first user. The region in which the character was written (the character itself written in black ink) corresponds to the first region of the present embodiment, the sheet of paper on the first user's side corresponds to the first medium of the present embodiment, and the image of the sheet of paper corresponds to the first image of the present embodiment. The captured image of the sheet of paper captured by the imager 12 may also include an image of the surroundings of the sheet of paper (for example, the mat or mounting board), but in this case, an image of only the portion corresponding to the sheet of paper is preferably extracted by performing image analysis on the received captured image and is preferably stored as the first image (image of the sheet of paper on the first user's side). The controller 33 of the information processing apparatus 30 stores the image of the sheet of paper on the first user's side, received via the communication interface 31, in the memory 32. Then, the controller 33 acquires the first image by reading the image of the sheet of paper on the first user's side from the memory 32 each time the operations in FIG. 5 are executed. For example, the controller 33 may acquire an image S1 of a sheet of paper M1 on the first user's side that includes a region R1, in which a character is written, as illustrated in FIG. 6. The region R1 corresponds to the first region of the present embodiment, the sheet of paper M1 on the first user's side corresponds to the first medium of the present embodiment, and the image S1 corresponds to the first image of the present embodiment.

The controller 33 also calculates the position, in the first image, of the first region in which the character is written. Specifically, the controller 33 extracts a group of pixels corresponding to the first region (hereinafter referred to as the "first pixel group") from among the pixels included in the first image by calculating color feature values for each pixel in the first image. The color feature values are R, G, and B values in the RGB color space (hereafter also referred to as "RGB values") in the present embodiment, but this example is not limiting, and any values can be adopted. For example, the color feature values may be hue H, saturation S, and value (lightness) V in the HSV color space, instead of or in addition to RGB values. Any appropriate method can be adopted to extract the first pixel group. For example, the first pixel group has RGB values unique to the first pixel group that are different from pixels corresponding to other regions. Therefore, the controller 33 can extract the first pixel group from the pixels included in the first image by comparing the RGB values of each pixel in the first image. The controller 33 calculates two-dimensional coordinate values in the first image corresponding to each pixel included in the extracted first pixel group and stores the calculated two-dimensional coordinate values in association with the pixels in the memory 32. Information indicating the position of the first pixel group is calculated as two-dimensional coordinate values in the first image in the present embodiment, but this example is not limiting, and any information can be adopted.

In the present embodiment, the capturing of the image of the sheet of paper on the first user's side can be performed at any time. For example, the controller 33 of the information processing apparatus 30 may transmit an instruction, to the communication interface 11 of the first image processing apparatus 10, to capture an image of the sheet of paper on the first user's side in a case in which an intention by the first user to submit the assigned work to the second user (hereinafter referred to as "intention to submit work") is detected. The controller 18 of the first image processing apparatus 10 may control the imager 12 to capture the image of the sheet of paper on the first user's side in response to an instruction received via the communication interface 11.

Any appropriate method can be adopted to detect the intention to submit work. For example, the controller 33 may determine that the intention to submit work has been detected in a case in which a predetermined condition is met. While the predetermined condition can be set freely, first and second examples are illustrated below as specific examples.

The first example is a case in which the intention by the first user to submit work is explicitly expressed. In this case, the predetermined condition can be that a predetermined operation by the first user is detected. For example, the predetermined operation can be the first user operating a touch screen included in the input interface 16 of the first image processing apparatus 10 and touching an icon, such as a button for submitting work, or the first user pressing a physical key included in the input interface 16. In a case in which the predetermined operation is detected, the controller 18 of the first image processing apparatus 10 may transmit information to the communication interface 31 of the information processing apparatus 30, via the communication interface 11 and the network 40, indicating that the predetermined operation by the first user has been detected. In a case in which such information is received by the communication interface 31, the controller 33 may determine that the predetermined condition has been met and that the intention to submit work has been detected.

The second example is a case in which the intention by the first user to submit work is implicitly expressed. In this case, the predetermined condition can be that a predetermined behavior by the first user is detected. For example, the predetermined behavior can be that the first user places the brush in a predetermined position (for example, on an inkstone resting on the mounting table) and removes his or her hand from the brush. Any appropriate method can be adopted to detect the predetermined behavior. For example, the imager 12 of the first image processing apparatus 10 may capture images of the first user and the mounting table as subjects at a predetermined frame rate and output image data of the captured images thus obtained. The controller 18 of the first image processing apparatus 10 may transmit the image data to the communication interface 31 of the information processing apparatus 30 via the communication interface 11 and the network 40. The controller 33 of the information processing apparatus 30 may determine whether the first user's behavior corresponds to the predetermined behavior by performing image analysis of the image data received by the communication interface 31. In a case in which, as a result of image analysis, it is determined that the first user's behavior corresponds to the predetermined behavior, the controller 33 may determine that the predetermined condition has been met and that the intention to submit work has been detected.

In the present embodiment, the submission of the assigned work to the second user is made by transmission of information indicating the assigned work from the first image processing apparatus 10 to the information processing apparatus 30 via the network 40 and subsequent transfer of the information from the information processing apparatus 30 to the second image processing apparatus 20. However, the submission of the assigned work to the second user is not limited to this example, and any method can be adopted. For example, information indicating the assigned work may be transmitted directly from the first image processing apparatus 10 to both the information processing apparatus 30 and the second image processing apparatus 20.

Step S101: the controller 33 projects the first image acquired in step S100 onto a predetermined position on the second medium. The predetermined position on the second medium is a position on the second medium such that the first image fits within the outline of the second medium during projection in the present embodiment and is indicated as two-dimensional coordinate values in the second medium. However, the predetermined position on the second medium is not limited to these examples, and any position and value can be adopted.

Figure 7:
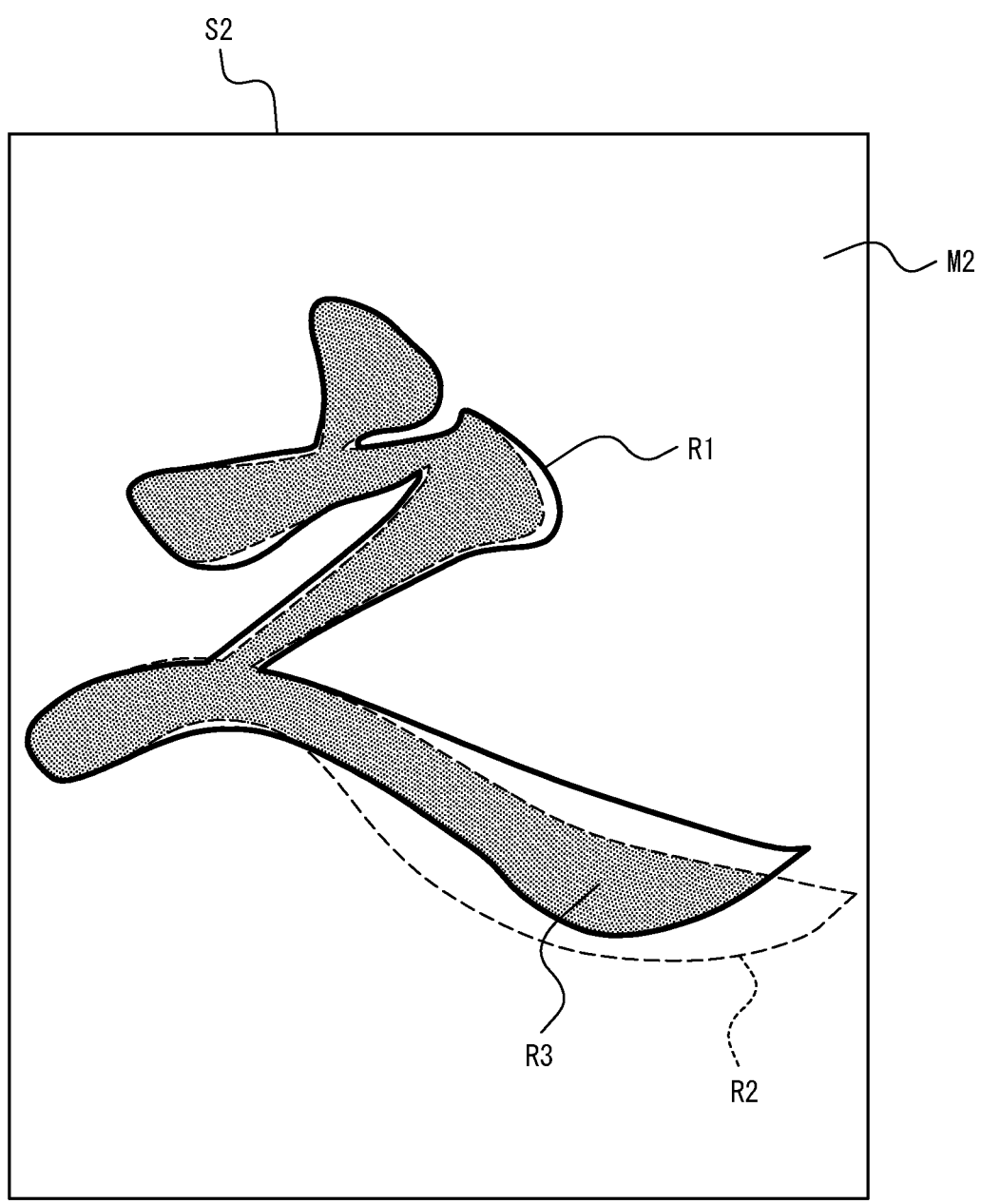
FIG. 7 is a diagram illustrating a specific example of a second image.

Specifically, the controller 33 sets a reference point for alignment in the second medium, aligns the first image with the second medium based on the reference point, and projects the first image on the second medium so as to project the first image at a predetermined position in the second medium. Any point in the second medium can be adopted as the reference point for alignment in the second medium. For example, the controller 33 sets the four corners of the second medium (rectangular sheet of paper) as reference points. In this case, the controller 33 can receive the captured image of the second medium from the second image processing apparatus 20 via the communication interface 31 and the network 40, identify the four corners of the second medium that is the projection plane by performing image analysis on the received captured image, and set the identified four corners as reference points. The controller 33 then transmits the set reference points to the communication interface 21 of the second image processing apparatus 20 via the communication interface 31 and the network 40. While controlling the projector 23 to project the first image onto the second medium, the controller 28 of the second image processing apparatus 20 aligns the first image with the second medium so that the four corners of the projected first image are within the frame of the reference points (i.e., the four corners of the second medium) received via the communication interface 21. For example, the first medium and the second medium are preferably sheets of paper of the same size, and the first image is preferably projected onto the second medium by enlarging, reducing, or correcting the tilt of the first image as necessary so that the four corners of the first image match the four corners of the second medium. In this way, the image S1 illustrated in FIG. 6 is aligned to a position on the sheet of paper M2 such that the image S1 fits within the outline of the sheet of paper M2 on the second user's side during projection, as illustrated in FIG. 7. The first image thereby fits within the outline of the second medium during projection, and the first image is projected onto a predetermined position on the second medium.

In the present embodiment, the character depicted in the first image is black, which is a color with no light, and therefore is difficult to project clearly onto the second medium. Therefore, when projecting the first image onto the second medium, the controller 33 preferably irradiates all of the mounting table (i.e., the top board of the mounting table) on which the second medium is placed with illumination light while avoiding the first region. Any technique can be adopted to irradiate with illumination light while avoiding the first region. For example, the controller 33 reads the two-dimensional coordinate values in the first image corresponding to each pixel included in the first pixel group from the memory 32. The controller 33 performs control by, for example, limiting the illumination range through masking so that the illumination light from the light source of the projector 23 is not irradiated onto the positions indicated by the two-dimensional coordinate values read from the memory 32. The controller 33 then irradiates all of the mounting table on which the second medium is placed with illumination light while projecting the first image onto a predetermined position on the second medium as described above. The illumination light can thereby be irradiated on all of the mounting table on which the second medium is placed, while avoiding the first region. As a result, when the first image is projected onto the second medium, the region in which the character is written, which corresponds to the first region, is darker than other regions. It is therefore easier to project the character depicted in the first image clearly onto the second medium. The illumination light is irradiated from a light source in the projector 23 in the present embodiment, but this configuration is not limiting. For example, the illumination light may be irradiated from an external light source separate from the projector 23. Here, if light is irradiated only onto the second medium placed on the mounting table instead of onto the entire mounting table on the second user's side, the contrast ratio between the portion corresponding to the first region on the second medium and other portions might be insufficient, the first region on the second medium might appear to be lighter than black (for example, light gray), and the reproducibility of the first medium might be reduced. For this reason, the illumination light is preferably irradiated onto all of the mounting table on which the second medium is placed.

The mounting table is more preferably shielded from light other than the illumination light and the projection light that projects the first image. Any method can be adopted to shield the mounting table from light. For example, in a case in which the mounting table is a rectangular desk, the mounting table may be shielded from light by surrounding the table with a U-shaped light-shielding panel (for example, an opaque acrylic board), i.e., by surrounding the three sides other than the side at which the second user is seated. By the mounting table being shielded from light other than the illumination light and the projection light that projects the first image, the contrast ratio between the portion corresponding to the first region of the mounting table and the other portions can be easily increased. Consequently, it is easier to project the character depicted in the first image even more clearly onto the second medium.

Step S102: the controller 33 acquires a second image of the second medium including a second region in which a line of a different color from the character depicted in the projected first image is drawn.

Specifically, the communication interface 31 of the information processing apparatus 30 receives, from the communication interface 21 of the second image processing apparatus 20 via the network 40, a set of images, captured by the imager 22, of the sheet of paper on the second user's side. The set of images includes an image capturing the sheet of paper on the second user's side onto which the first image was projected (hereinafter referred to as the "character image"), an image capturing the sheet of paper on the second user's side on which a line was drawn by the second user with the first image projected onto the sheet of paper on the second user's side (hereinafter referred to as the "correction result image"), and an image capturing the sheet of paper on the second user's side on which a line was drawn by the second user without the first image projected onto the sheet of paper on the second user's side, for example by suspending projection of the first image (hereinafter referred to as the "line image"). The region in which the line is drawn corresponds to the second region of the present embodiment, the sheet of paper on the second user's side corresponds to the second medium of the present embodiment, and the set of images corresponds to the second image of the present embodiment. The captured image of the sheet of paper captured by the imager 22 may also include an image of the surroundings of the sheet of paper (for example, the mat or mounting board), but in this case, an image of only the portion corresponding to the sheet of paper is preferably extracted by performing image analysis on the received captured image and is preferably stored as the second image (set of images including the character image, correction result image, and line image). The controller 33 of the information processing apparatus 30 stores the set of images, received via the communication interface 31, in association with each other in the memory 32. Then, the controller 33 acquires the second image by reading the set of images from the memory 32 each time the operations in FIG. 5 are executed.

For example, as illustrated in FIG. 7, the controller 33 may acquire three types of images as a set of images: an image S2 (corresponding to the correction result image) of a sheet of paper M2 on the second user's side that includes the region R1 in which the character is written, a region R2 in which the line is drawn, and an overlapping region R3 in which regions R1 and R2 overlap, an image (corresponding to the character image) of the sheet of paper M2 that includes only the region R1, and an image (corresponding to the line image) of the sheet of paper M2 that includes only the region R2. The region R2 (the vermilion line itself) in which the line is drawn corresponds to the second region of the present embodiment, the sheet of paper M2 on the second user's side corresponds to the second medium of the present embodiment, and the three types of images correspond to the second image formed by the set of images of the present embodiment. In FIG. 7, for easier understanding of the drawing, the region R1 is illustrated as a solid outline and the region R2 as a dashed outline, and the shaded area corresponds to the overlapping region R3.

In the present embodiment, the capturing of the set of images of the sheet of paper on the second user's side can be performed at any time. For example, for the "character image", the controller 33 of the information processing apparatus 30 may transmit an instruction to the communication interface 21 of the second image processing apparatus 20 to capture an image of the sheet of paper on the second user's side with the first image projected thereon. The controller 28 of the second image processing apparatus 20 may control the imager 22 to capture the image of the sheet of paper on the second user's side, while continuing to project the first image onto the sheet of paper with the projector 23, in response to the instruction received via the communication interface 21. The "character image" can thereby be captured.

For the "correction result image" and the "line image", the controller 33 may transmit an instruction, to the communication interface 21 of the second image processing apparatus 20, to capture an image of the sheet of paper on the second user's side in a case in which an intention by the second user to notify the first user of the correction result (hereinafter referred to as "intention to provide notification of results") is detected. The controller 28 of the second image processing apparatus 20 may control the imager 22 to capture the image of the sheet of paper on the second user's side, while continuing to project or suspending projection of the first image onto the sheet of paper with the projector 23, in response to the instruction received via the communication interface 21. The "correction result image" and the "line image" can thereby be captured.

Any appropriate method can be adopted to detect the intention to provide notification of results. For example, the controller 33 may determine that the intention to provide notification of results has been detected in a case in which a predetermined condition is met. While the predetermined condition can be set freely, third and fourth examples are illustrated below as specific examples.

The third example is a case in which the intention by the second user to provide notification of results is explicitly expressed. In this case, the predetermined condition can be that a predetermined operation by the second user is detected. For example, the predetermined operation can be the second user operating a touch screen included in the input interface 26 of the second image processing apparatus 20 and touching an icon, such as a button for providing notification of correction results, or the second user pressing a physical key included in the input interface 26. In a case in which the predetermined operation is detected, the controller 28 of the second image processing apparatus 20 may transmit information to the communication interface 31 of the information processing apparatus 30, via the communication interface 21 and the network 40, indicating that the predetermined operation by the second user has been detected. In a case in which such information is received by the communication interface 31, the controller 33 may determine that the predetermined condition has been met and that the intention to provide notification of results has been detected.

The fourth example is a case in which the intention by the second user to provide notification of results is implicitly expressed. In this case, the predetermined condition can be that a predetermined behavior by the second user is detected. For example, the predetermined behavior can be that the second user places the brush in a predetermined position (for example, on an inkstone resting on the mounting table) and removes his or her hand from the brush. Any appropriate method can be adopted to detect the predetermined behavior. For example, the imager 22 of the second image processing apparatus 20 may capture images of the second user and the mounting table as subjects at a predetermined frame rate and output image data of the captured images thus obtained. The controller 28 of the second image processing apparatus 20 may transmit the image data to the communication interface 31 of the information processing apparatus 30 via the communication interface 21 and the network 40. The controller 33 of the information processing apparatus 30 may determine whether the second user's behavior corresponds to the predetermined behavior by performing image analysis of the image data received by the communication interface 31. In a case in which, as a result of image analysis, it is determined that the second user's behavior corresponds to the predetermined behavior, the controller 33 may determine that the predetermined condition has been met and that the intention to provide notification of results has been detected.

In the present embodiment, the notification of the correction result to the first user is made by transmission of information indicating the correction result from the second image processing apparatus 20 to the information processing apparatus 30 via the network 40 and subsequent transfer of the information from the information processing apparatus 30 to the first image processing apparatus 10. However, the notification of the correction result to the first user is not limited to this example, and any method can be adopted. For example, information indicating the correction result may be transmitted directly from the second image processing apparatus 20 to both the information processing apparatus 30 and the first image processing apparatus 10.

Step S103: the controller 33 determines whether there is an overlapping region in the second image acquired in step S102. The "overlapping region" is a region in which the first region and the second region overlap. In a case in which it is determined that there is an overlapping region (S103: Yes), the process advances to step S104. In a case in which it is determined that there is no overlapping region (S103: No), the process advances to step S106.

Specifically, the controller 33 calculates the position of each of the first region and the second region on the second image by performing the following image analysis on the second image, formed by the set of images (including the "character image", "correction result image", and "line image") acquired in step S102.

The controller 33 extracts a group of pixels corresponding to the first region (hereinafter also referred to as the "second pixel group") from among the pixels included in the "character image". Any appropriate method can be adopted to extract the second pixel group. For example, like the first pixel group described above for the first image, the second pixel group has RGB values unique to the second pixel group that are different from pixels corresponding to other regions. Therefore, the controller 33 can extract the second pixel group from the pixels included in the character image by comparing the RGB values of each pixel in the character image. The controller 33 calculates two-dimensional coordinate values in the character image corresponding to each pixel included in the extracted second pixel group and stores the calculated two-dimensional coordinate values in association with the pixels in the memory 32. Information indicating the position of the second pixel group is calculated as two-dimensional coordinate values in the character image in the present embodiment, but this example is not limiting, and any information can be adopted.

The controller 33 also extracts a group of pixels corresponding to the second region (hereinafter also referred to as the "third pixel group") from among the pixels included in the "line image". Any appropriate method can be adopted to extract the third pixel group. For example, like the first pixel group described above, the third pixel group has RGB values unique to the third pixel group that are different from pixels corresponding to other regions. Therefore, the controller 33 can extract the third pixel group from the pixels included in the line image by comparing the RGB values of each pixel in the line image. The controller 33 calculates two-dimensional coordinate values in the line image corresponding to each pixel included in the extracted third pixel group and stores the calculated two-dimensional coordinate values in association with the pixels in the memory 32. Information indicating the position of the third pixel group is calculated as the two-dimensional coordinate values in the line image in the present embodiment, but this example is not limiting, and any information can be adopted.

The controller 33 then determines whether there is an overlapping region in the "correction result image" by comparing the two-dimensional coordinate values of each of the second and third pixel groups calculated in this way. In the present embodiment, the positions indicated by the two-dimensional coordinate values in the character image, the two-dimensional coordinate values in the line image, and the two-dimensional coordinate values in the correction result image are equal to each other. Accordingly, in a case in which at least one pixel with equal two-dimensional coordinate values is identified as a result of the comparison, the controller 33 can determine that there is an overlapping region in the second image. The controller 33 calculates two-dimensional coordinate values in the correction result image corresponding to each pixel included in the pixel group formed by at least one identified pixel (hereinafter also referred to as the "fourth pixel group") and stores the calculated two-dimensional coordinate values in association with the pixels in the memory 32. The fourth pixel group corresponds to the overlapping region in the present embodiment. In the example illustrated in FIG. 7, the controller 33 can identify an overlapping region R3 (shaded area), where the regions R1 and R2 overlap, as an overlapping region and determine that there is an overlapping region in the second image. Information indicating the position of the fourth pixel group is calculated as the two-dimensional coordinate values in the correction result image in the present embodiment, but this example is not limiting, and any information can be adopted.

Step S104: in a case in which it is determined that there is an overlapping region (step S103: Yes), the controller 33 corrects the color data in the overlapping region.

Specifically, the controller 33 corrects the RGB values corresponding to the colors of the overlapping region identified in step S103 based on the RGB values corresponding to the color of the line in the region in the second image where the first and second regions do not overlap. In the example illustrated in FIG. 7, the controller 33 can correct the RGB values corresponding to the color of the overlapping region R3 based on the RGB values corresponding to the color of the line in the region in the image S2 where the regions R1 and R2 do not overlap. The image yielded by correcting the RGB values corresponding to the color of the overlapping region R3 of the second image (here, the "correction result image") is referred to as the "corrected second image".

Any method can be adopted to correct the RGB values. For example, the controller 33 selects one pixel, from among the pixels of the third pixel group, that is not included in the fourth pixel group. The one pixel is a pixel of the third pixel group that is not affected by darkening and retains the RGB values corresponding to the original color of the third pixel group. The controller 33 reads the RGB values corresponding to the one selected pixel from the memory 32. The controller 33 calculates the RGB values corresponding to the color of each pixel in the fourth pixel group. The controller 33 calculates the difference between the RGB values corresponding to the one selected pixel and the calculated RGB values corresponding to the color of each pixel in the fourth pixel group. Based on the calculated difference, the controller 33 can correct the RGB values corresponding to the color of each pixel in the fourth pixel group to be closer, by a predetermined percentage, to the RGB values corresponding to the one selected pixel. The predetermined percentage can be freely determined for each pixel. For example, as the predetermined percentage is smaller (i.e., the closer to 0%), the difference is better preserved, and the appearance of the overlapping region is better maintained. On the other hand, as the predetermined percentage is larger (i.e., the closer to 100%), the difference becomes smaller, the third pixel group in the overlapping region approaches the original color, and it becomes easier to heighten the visibility of the improvements. Therefore, the predetermined percentage can be set taking into consideration the balance between the degree to which the appearance of the correction results is maintained and the visibility of the improvements.

The controller 33 may correct the RGB values corresponding to the colors of the overlapping region based not only on the RGB values corresponding to the color of the line in the region in the second image where the first and second regions do not overlap, but also on the RGB values corresponding to the color of the character in the first region. Specifically, the controller 33 may set a rate of increase, as a predetermined value, for increasing some or all of the R, G, and B values by a predetermined percentage according to the RGB values corresponding to the color of the character in the first region. For example, in a case in which the color of the character in the first region is black, as in the present embodiment, the R, G, and B values corresponding to the color of each pixel corresponding to the fourth pixel group will all decrease. In this case, the controller 33 can set a rate of increase (for example, +10%), as a predetermined value, for increasing all of the R, G, and B values by a predetermined percentage. The rate of increase can be set separately for each of the R, G, and B values according to the RGB values corresponding to the color of the character in the first region.

In the present embodiment, the predetermined value is set taking into consideration the effect of blackening that occurs during the projection of the correction results on the first image processing apparatus 10 side. This can achieve the desired degree of mitigation of the effect of blackening, which occurs twice: once when the correction results are captured on the second image processing apparatus 20 side, and once when the correction results are projected on the first image processing apparatus 10 side. Accordingly, the visibility of improvements and the reproducibility of correction results on the first user's side are improved, and the learning effect with e-learning of calligraphy is further enhanced. However, the correction of the color data of the overlapping region is not limited to these examples, and any method can be adopted.

Step S105: the controller 33 projects the corrected second image onto the first medium so that the position of the character matches.

Specifically, the controller 33 identifies a position on the first medium such that the outline of the second pixel group (corresponding to the first region) included in the corrected second image coincides with the outline of the character written on the first medium (the character itself written in ink) during projection. Such a position on the first medium is indicated as two-dimensional coordinate values of the first medium in the present embodiment, but this example is not limiting, and any value can be adopted. Any method can be adopted to identify the position on the first medium. For example, the controller 33 reads the first image from the memory 32 and calculates the area that the character written on the first medium occupies in the first medium. The controller 33 reads the second image from the memory 32 and calculates the area that the second pixel group occupies in the second image. The controller 33 enlarges or reduces the second image while maintaining the aspect ratio until the area of the second pixel group matches the area of the character written on the first medium, which is the projection plane. The controller 33 calculates the magnification or reduction ratio at this time as a projection magnification ratio. At this point, the controller 33 also calculates values used in other processes, such as tilt correction (hereinafter referred to as "other adjustment values"), as necessary. The controller 33 transmits the calculated projection magnification ratio and/or other adjustment values to the communication interface 11 of the first image processing apparatus 10 via the communication interface 31 and the network 40. The controller 18 of the first image processing apparatus 10 controls the projector 13 to project the second image onto the first medium according to the projection magnification ratio and/or other adjustment values received via the communication interface 11. Then, the controller 18 aligns the outline of the second pixel group included in the second image so as to overlap the outline of the character written on the first medium without gaps. For example, the outline of the image S2 illustrated in FIG. 7 with corrected color data is aligned so as to overlap, without gaps, the outline of the region R1 corresponding to the character written on the sheet of paper M1 on the first user's side, illustrated in FIG. 6. The corrected second image is thereby projected onto the first medium so that the position of the character matches. However, the projection of the second image onto the first image is not limited to these example, and any method can be adopted.

Step S106: in a case in which it is determined that there is no overlapping region (step S103: No), the controller 33 projects the second image onto the first medium so that the position of the character matches, without correcting the color data of the second image. The projection method for the second image is the same as described above in step S105, except that the color data is not corrected, and hence an explanation thereof is omitted.

As described above, the information processing apparatus 30 according to the present embodiment acquires a first image of a first medium including a first region in which a character is written. The information processing apparatus 30 projects the first image onto a predetermined position of a second medium. The information processing apparatus 30 acquires a second image of the second medium including a second region in which a line of a different color from the character depicted in the projected first image is drawn. The information processing apparatus 30 corrects color data of an overlapping region in which the first region and the second region overlap in the second image. The information processing apparatus 30 projects the corrected second image onto the first medium so that the position of the character matches.

According to such a configuration, the second image, in which the color data of the overlapping region is corrected, is projected onto the first medium so that the position of the character matches. Thus, for example, even in a case in which darkening occurs in an overlapping region in the second image, the second image can be projected onto the first medium with the color data corrected so that a predetermined percentage of the darkening is eliminated. Accordingly, the technology related to image projection is improved in that the visibility of improvements and the reproducibility of correction results on the first user's side are improved, and the learning effect with e-learning of calligraphy is enhanced.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which the configuration and operations of the information processing apparatus 30 in the above embodiment are distributed to multiple computers capable of communicating with each other can be implemented. For example, an embodiment in which some or all of the components of the information processing apparatus 30 are provided in the first image processing apparatus 10 and the second image processing apparatus 20 can also be implemented.

For example, in the embodiment described above, the first image (still image) is captured after the assigned work is completed on the first user's side, the first image is projected on the second user's side, the second image (still image) is captured after the first image is projected on the second user's side and after the correction results are ready, and the corrected second image is projected on the first user's side. In contrast, in a first variation of the present embodiment, moving image data illustrating the state (for example, appearance) of each other's sheet of paper, which changes over time, may be transmitted and received between the first user and the second user in real time and projected onto each other's sheet of paper in real time. In the first variation, the moving image data of each other's sheet of paper is transmitted and received between the first user and the second user, and the moving images are projected onto each other's sheet of paper in real time.

Specifically, in the first variation, the first image is a first image with a predetermined number of frames, and the second image is a second image with a predetermined number of frames. In the first variation, the information processing apparatus 30 acquires a predetermined number of frames of the first image of the first medium including the first region. The information processing apparatus 30 projects the predetermined number of frames of the first image onto a predetermined position of a second medium. The information processing apparatus 30 acquires a predetermined number of frames of the second image of the second medium including the second region. The information processing apparatus 30 corrects color data of an overlapping region in which the first region and the second region overlap in the second image. The information processing apparatus 30 projects the corrected second image onto the first medium so that the position of the character matches.

The first image with a predetermined number of frames may be a first image (first video) captured at a predetermined frame rate by the imager 12 of the first image processing apparatus 10 during a first period. For example, the first period may be a period from the time when a start event (for example, the first user pressing a button or other icon, or a physical key, included in the input interface 16 or picking up the brush on the inkstone) is detected on the first image processing apparatus 10 side to the time when an end event (for example, the intention to submit a work) is detected. The start event and end event can be detected in the same manner as in the first and second examples described above. Alternatively, the first period may be the period from the start time to the end time of the class. The controller 18 of the first image processing apparatus 10 may transmit the first image with a predetermined number of frames in real time to the second image processing apparatus 20 via the information processing apparatus 30 or directly to both the information processing apparatus 30 and the second image processing apparatus 20. On the second image processing apparatus 20 side, the received first image of a predetermined number of frames can be projected as a moving image onto the second medium to display, in real time, the state of the sheet of paper on the first user's side, which changes over time.

The second image with a predetermined number of frames may be a second image (second video) captured at a predetermined frame rate by the imager 22 of the second image processing apparatus 20 during a second period. For example, after the point at which the "character image" is captured on the second image processing apparatus 20 side, the second period may be a period from the time when a start event (for example, the second user pressing a button or other icon, or a physical key, included in the input interface 16 or picking up the brush on the inkstone) is detected on the second image processing apparatus 20 side to the time when an end event (for example, the intention to provide notification of results) is detected. The start event and end event can be detected in the same manner as in the third and fourth examples described above. Alternatively, the second period may be the period from the start time to the end time of the class. The controller 28 of the second image processing apparatus 20 may transmit the second image with a predetermined number of frames in real time to the first image processing apparatus 10 via the information processing apparatus 30 or directly to both the information processing apparatus 30 and the first image processing apparatus 10. On the first image processing apparatus 10 side, the received second image of a predetermined number of frames can be projected as a moving image onto the first medium to display, in real time, the state of the sheet of paper on the second user's side, which changes over time.

According to the first variation, the first user and the second user can check not only the results of each other's work, but also the work process (for example, the stroke order or how the brush is held). During e-learning of calligraphy, it thus becomes easier to create a sense of physical presence equivalent to a face-to-face class.

For example, in the second variation of the present embodiment, in addition to the first variation, image data of a predetermined number of frames, the image data being frontal images respectively of the first user and the second user, may also be acquired and transmitted between the first image processing apparatus 10 and the second image processing apparatus 20, indirectly via the information processing apparatus 30 or directly, in real time. The first image processing apparatus 10 and the second image processing apparatus 20 may display the first user and the second user to each other in real time on panels, such as liquid crystal displays, respectively arranged in front of the first user and the second user.

Specifically, in the second variation, the controller 33 of the information processing apparatus 30 further acquires a third image of a predetermined number of frames and a fourth image of a predetermined number of frames, the third image and the fourth image being frontal images respectively of the first user who writes the character on the first medium and the second user who draws the line on the second medium, and displays, based on the third image of the predetermined number of frames and the fourth image of the predetermined number of frames, the first user and the second user to each other in real time on panels (for example, display apparatuses such as liquid crystal displays) respectively arranged in front of the first user and the second user. For example, images of the first user and the second user may be captured via external imaging apparatuses, such as cameras installed in panels respectively arranged in front of the first user and the second user.

The third image with a predetermined number of frames may be a third image (third video) captured at a predetermined frame rate by the imager 12 of the first image processing apparatus 10 during a third period. For example, the third period may be the same as or different from the aforementioned first period. For example, in a case in which the first period is from the time when a start event is detected to the time when an end event is detected on the first image processing apparatus 10 side, the third period may be from the start time to the end time of the class. The controller 18 of the first image processing apparatus 10 may transmit the third image with a predetermined number of frames in real time to the second image processing apparatus 20 via the information processing apparatus 30 or directly to both the information processing apparatus 30 and the second image processing apparatus 20. On the second image processing apparatus 20 side, the received third image of a predetermined number of frames can be displayed as a moving image on a panel arranged in front of the second user to display, in real time, the appearance of the first user, which changes over time.

The fourth image with a predetermined number of frames may be a fourth image (fourth video) captured at a predetermined frame rate by the imager 22 of the second image processing apparatus 20 during a fourth period. For example, the fourth period may be the same as or different from the aforementioned second period. For example, in a case in which the second period is the period between detection of a start event and an end event after the point at which the "character image" is captured on the second image processing apparatus 20 side, the fourth period may be from the start time to the end time of the class. The controller 28 of the second image processing apparatus 20 may transmit the fourth image with a predetermined number of frames in real time to the first image processing apparatus 10 via the information processing apparatus 30 or directly to both the information processing apparatus 30 and the first image processing apparatus 10. On the first image processing apparatus 10 side, the received fourth image of a predetermined number of frames can be displayed as a moving image on a panel arranged in front of the first user to display, in real time, the appearance of the second user, which changes over time.

According to the second variation, the first user and the second user can also confirm additional information, such as each other's facial expressions or posture. During e-learning of calligraphy, it thus becomes even easier to create a sense of physical presence equivalent to a face-to-face class.

For example, an embodiment in which a general purpose computer functions as the information processing apparatus 30 according to the above embodiment can also be implemented. Specifically, a program in which processes for realizing the functions of the information processing apparatus according to the above embodiment are written may be stored in a memory of a general purpose computer, and the program may be read and executed by a processor. Accordingly, the present disclosure can also be implemented as a program executable by a processor, or a non-transitory computer readable medium storing the program.

Examples of some embodiments of the present disclosure are described below. However, it should be noted that the embodiments of the present disclosure are not limited to these examples.

[Appendix 1] An information processing apparatus comprising a controller configured to:
  acquire a first image of a first medium including a first region in which a character is written,
  project the first image onto a predetermined position of a second medium,
  acquire a second image of the second medium including a second region in which a line of a different color from the character depicted in the projected first image is drawn,
  correct color data of an overlapping region in which the first region and the second region overlap in the second image, and
  project the corrected second image onto the first medium so that a position of the character matches.

[Appendix 2] The information processing apparatus according to appendix 1, wherein
  a color of the character is black, and
  when projecting the first image onto the second medium, the controller is configured to irradiate all of a mounting table on which the second medium is placed with illumination light while avoiding the first region.

[Appendix 3] The information processing apparatus according to appendix 2, wherein the mounting table is shielded from light other than the illumination light and projection light that projects the first image.

[Appendix 4] The information processing apparatus according to any one of appendix 1 to 3, wherein the color data is an RGB value corresponding to a color of the overlapping region.

[Appendix 5] The information processing apparatus according to appendix 4, wherein the controller is configured to correct the RGB value corresponding to the color of the overlapping region based on an RGB value corresponding to a color of the line in a region in which the first region and the second region do not overlap in the second image.

[Appendix 6] The information processing apparatus according to any one of appendices 1 to 5, wherein the first image is a first image with a predetermined number of frames, and the second image is a second image with a predetermined number of frames.

[Appendix 7] The information processing apparatus according to appendix 6, wherein the controller is configured to further acquire a third image of a predetermined number of frames and a fourth image of a predetermined number of frames, the third image and the fourth image being frontal images respectively of a first user who writes the character on the first medium and a second user who draws the line on the second medium, and display, based on the third image of the predetermined number of frames and the fourth image of the predetermined number of frames, the first user and the second user to each other in real time on panels respectively arranged in front of the first user and the second user.

[Appendix 8] A projection method to be executed by an information processing apparatus, the projection method comprising:
  acquiring a first image of a first medium including a first region in which a character is written;
  projecting the first image onto a predetermined position of a second medium;
  acquiring a second image of the second medium including a second region in which a line of a different color from the character depicted in the projected first image is drawn;
  correcting color data of an overlapping region in which the first region and the second region overlap in the second image; and
  projecting the corrected second image onto the first medium so that a position of the character matches.

[Appendix 9] The projection method according to appendix 8, wherein
  a color of the character is black,
  the projection method further comprising irradiating, when projecting the first image onto the second medium, all of a mounting table on which the second medium is placed with illumination light while avoiding the first region.

[Appendix 10] The projection method according to appendix 9, wherein the mounting table is shielded from light other than the illumination light and projection light that projects the first image.

[Appendix 11] The projection method according to any one of appendices 8 to 10, wherein the color data is an RGB value corresponding to a color of the overlapping region.

[Appendix 12] The projection method according to appendix 11, further comprising correcting the RGB value corresponding to the color of the overlapping region based on an RGB value corresponding to a color of the line in a region in which the first region and the second region do not overlap in the second image.

[Appendix 13] The projection method according to any one of appendices 8 to 12, wherein the first image is a first image with a predetermined number of frames, and the second image is a second image with a predetermined number of frames.

[Appendix 14] The projection method according to appendix 13, further comprising further acquiring a third image of a predetermined number of frames and a fourth image of a predetermined number of frames, the third image and the fourth image being frontal images respectively of a first user who writes the character on the first medium and a second user who draws the line on the second medium, and displaying, based on the third image of the predetermined number of frames and the fourth image of the predetermined number of frames, the first user and the second user to each other in real time on panels respectively arranged in front of the first user and the second user.

[Appendix 15] A non-transitory computer readable medium storing a program configured to cause an information processing apparatus to execute operations, the operations comprising:
  acquiring a first image of a first medium including a first region in which a character is written;
  projecting the first image onto a predetermined position of a second medium;

acquiring a second image of the second medium including a second region in which a line of a different color from the character depicted in the projected first image is drawn;

correcting color data of an overlapping region in which the first region and the second region overlap in the second image; and projecting the corrected second image onto the first medium so that a position of the character matches.

[Appendix 16] The non-transitory computer readable medium according to appendix 15, wherein a color of the character is black, the operations further comprising irradiating, when projecting the first image onto the second medium, all of a mounting table on which the second medium is placed with illumination light while avoiding the first region.

[Appendix 17] The non-transitory computer readable medium according to appendix 16, wherein the mounting table is shielded from light other than the illumination light and projection light that projects the first image.

[Appendix 18] The non-transitory computer readable medium according to any one of appendices 15 to 17, wherein the color data is an RGB value corresponding to a color of the overlapping region.

[Appendix 19] The non-transitory computer readable medium according to appendix 18, the operations further comprising correcting the RGB value corresponding to the color of the overlapping region based on an RGB value corresponding to a color of the line in a region in which the first region and the second region do not overlap in the second image.

[Appendix 20] The non-transitory computer readable medium according to any one of appendices 15 to 19, wherein the first image is a first image with a predetermined number of frames, and the second image is a second image with a predetermined number of frames.

The invention claimed is:

1. An information processing apparatus comprising a controller configured to:

acquire a first image of a first medium including a first region in which a character is written, project the first image onto a predetermined position of a second medium, acquire a second image of the second medium including a second region in which a line of a different color from the character depicted in the projected first image is drawn, correct color data of an overlapping region in which the first region and the second region overlap in the second image, and project the corrected second image onto the first medium so that a position of the character matches.

2. The information processing apparatus according to claim 1, wherein a color of the character is black, and when projecting the first image onto the second medium, the controller is configured to irradiate all of a mounting table on which the second medium is placed with illumination light while avoiding the first region.

3. The information processing apparatus according to claim 2, wherein the mounting table is shielded from light other than the illumination light and projection light that projects the first image.

4. The information processing apparatus according to claim 1, wherein the color data is an RGB value corresponding to a color of the overlapping region.

5. The information processing apparatus according to claim 4, wherein the controller is configured to correct the RGB value corresponding to the color of the overlapping region based on an RGB value corresponding to a color of the line in a region in which the first region and the second region do not overlap in the second image.

6. The information processing apparatus according to claim 1, wherein the first image is a first image with a predetermined number of frames, and the second image is a second image with a predetermined number of frames.

7. The information processing apparatus according to claim 6, wherein the controller is configured to further acquire a third image of a predetermined number of frames and a fourth image of a predetermined number of frames, the third image and the fourth image being frontal images respectively of a first user who writes the character on the first medium and a second user who draws the line on the second medium, and display, based on the third image of the predetermined number of frames and the fourth image of the predetermined number of frames, the first user and the second user to each other in real time on panels respectively arranged in front of the first user and the second user.

8. A projection method to be executed by an information processing apparatus, the projection method comprising:

acquiring a first image of a first medium including a first region in which a character is written;

projecting the first image onto a predetermined position of a second medium;

acquiring a second image of the second medium including a second region in which a line of a different color from the character depicted in the projected first image is drawn;

correcting color data of an overlapping region in which the first region and the second region overlap in the second image; and projecting the corrected second image onto the first medium so that a position of the character matches.

9. The projection method according to claim 8, wherein a color of the character is black, the projection method further comprising irradiating, when projecting the first image onto the second medium, all of a mounting table on which the second medium is placed with illumination light while avoiding the first region.

10. The projection method according to claim 9, wherein the mounting table is shielded from light other than the illumination light and projection light that projects the first image.

11. The projection method according to claim 8, wherein the color data is an RGB value corresponding to a color of the overlapping region.

12. The projection method according to claim 11, further comprising correcting the RGB value corresponding to the color of the overlapping region based on an RGB value corresponding to a color of the line in a region in which the first region and the second region do not overlap in the second image.

13. The projection method according to claim 8, wherein the first image is a first image with a predetermined number of frames, and the second image is a second image with a predetermined number of frames.

14. The projection method according to claim 13, further comprising further acquiring a third image of a predetermined number of frames and a fourth image of a predetermined number of frames, the third image and the fourth image being frontal images respectively of a first user who writes the character on the first medium and a second user who draws the line on the second medium, and displaying, based on the third image of the predetermined number of frames and the fourth image of the predetermined number of frames, the first user and the second user to each other in real time on panels respectively arranged in front of the first user and the second user.

15. A non-transitory computer readable medium storing a program configured to cause an information processing apparatus to execute operations, the operations comprising:
 acquiring a first image of a first medium including a first region in which a character is written;
 projecting the first image onto a predetermined position of a second medium;
 acquiring a second image of the second medium including a second region in which a line of a different color from the character depicted in the projected first image is drawn;
 correcting color data of an overlapping region in which the first region and the second region overlap in the second image; and
 projecting the corrected second image onto the first medium so that a position of the character matches.

16. The non-transitory computer readable medium according to claim 15, wherein
 a color of the character is black,
 the operations further comprising irradiating, when projecting the first image onto the second medium, all of a mounting table on which the second medium is placed with illumination light while avoiding the first region.

17. The non-transitory computer readable medium according to claim 16, wherein the mounting table is shielded from light other than the illumination light and projection light that projects the first image.

18. The non-transitory computer readable medium according to claim 15, wherein the color data is an RGB value corresponding to a color of the overlapping region.

19. The non-transitory computer readable medium according to claim 18, the operations further comprising correcting the RGB value corresponding to the color of the overlapping region based on an RGB value corresponding to a color of the line in a region in which the first region and the second region do not overlap in the second image.

20. The non-transitory computer readable medium according to claim 15, wherein the first image is a first image with a predetermined number of frames, and the second image is a second image with a predetermined number of frames.

* * * * *